(12) United States Patent
Morimoto (10) Patent No.: US 6,504,811 B1
(45) Date of Patent: Jan. 7, 2003

(54) OPTICAL INFORMATION STORAGE UNIT

(75) Inventor: Yasuaki Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/285,196

(22) Filed: Mar. 31, 1999

(30) Foreign Application Priority Data

Jun. 16, 1998 (JP) .......................................... 10-168569

(51) Int. Cl.[7] ........................ G11B 7/135; G11B 11/105
(52) U.S. Cl. ........................ 369/110.03; 369/112.17; 369/110.04; 369/112.02
(58) Field of Search .................. 369/110.01, 110.4, 369/112.16, 119, 44.13, 116, 44.38, 13.56, 53.35, 102, 117, 118, 112.17, 112.05, 13.29, 112.19, 112.03, 112.02, 110.03

(56) References Cited

U.S. PATENT DOCUMENTS

| | | | | |
|---|---|---|---|---|
| 4,375,096 A | * | 2/1983 | Gorog et al. ............... | 369/102 |
| 4,507,773 A | * | 3/1985 | McCann et al. ............ | 369/112.17 |
| 4,670,869 A | * | 6/1987 | Chen ....................... | 369/112.05 |
| 5,673,247 A | * | 9/1997 | Sekimoto et al. .......... | 369/112.17 |
| 5,701,279 A | * | 12/1997 | Hoshi et al. ............... | 369/110.04 |
| 5,828,630 A | * | 10/1998 | Gage et al. ................ | 369/116 |
| 6,118,574 A | * | 9/2000 | Imanishi et al. ........... | 359/305 |
| 6,266,313 B1 | * | 7/2001 | Yanagawa et al. ......... | 369/110.01 |

FOREIGN PATENT DOCUMENTS

| | | |
|---|---|---|
| EP | 908878 | 4/1999 |
| JP | 61-68741 | 4/1986 |
| JP | 8-7327 | 1/1996 |
| JP | 9-128825 | 5/1997 |
| JP | 9-282730 | 10/1997 |
| JP | 9-282733 | 10/1997 |

* cited by examiner

Primary Examiner—W. R. Young
Assistant Examiner—Kim-Kwok Chu
(74) Attorney, Agent, or Firm—Greer, Burns & Crain, Ltd.

(57) ABSTRACT

An optical information storage unit for reproducing information recorded on lands and grooves of a magneto-optical recording medium by means of a reflected light obtained from a luminous flux which has been emitted from a light source, irradiated onto the recording medium and reflected from the recording medium. The optical information storage unit includes a first wave plate on which the reflected light from the magneto-optical recording medium is incident; a diffraction grating on which the light having been transmitted through the first wave plate is incident; a second wave plate on which the light having been transmitted through the diffraction grating is incident; and a polarization detecting unit on which the light having been transmitted through the second wave plate is incident.

20 Claims, 8 Drawing Sheets

OPTICAL INFORMATION STORAGE UNIT

BACKGROUND OF THE INVENTION

1. Field of the Invention

The present invention generally relates to an optical information storage unit, and particularly relates to an optical information storage unit for reproducing information recorded on lands and grooves of a magneto-optical recording medium by extracting 0th order light and +/−1st order lights by means of diffraction grating from a reflected beam.

The present invention further relates to an optical information storage unit which has a magneto-optic detection optical system provided with phase compensation means which supplies different amounts of phase compensation for land reproduction and for groove reproduction, in order to realize a high-density magneto-optical recording medium.

In this specification, an "information storage unit" refers to an apparatus which records information on and/or reproduces information from a recording medium.

2. Description of the Related Art

Presently, an optical recording medium is widely used as a recording medium from which audio and video signals can be reproduced. Particularly, considerable research and development have been carried out for a magneto-optical recording medium and a phase change recording medium for use as a rewritable high-density recording medium. A recording density of an optical recording medium on which information is stored in a spiral or concentric manner can be improved by reducing a track pitch and/or by increasing a line recording density.

A reduction in track pitch and an increase in line recording density can both be achieved by introducing a short wavelength semiconductor laser for storage and reproduction. However, a semiconductor laser of a short wavelength, i.e., in the range of green or blue, is not yet on the market at a reasonable price since it is not stable in room temperature and thus is not capable of continuous oscillation for a long period of time.

Thus, there is a need for a method which can improve a recording density of a magneto-optical storage unit while using a laser of a presently used wavelength. One such method is as an MSR (magnetic super resolution) method described below.

With a RAM medium such as a magneto-optical recording medium, light beams having equal wavelengths for writing and reading are utilized, whereas with a ROM medium having prerecorded information, phase pits are formed by means of a gas laser having a short wavelength.

The RAM medium and the ROM medium have substantially identical reproduction conditions. However, the RAM medium has a disadvantage in that a short-wavelenght light source not yet on the market is needed for high-density recording of information.

A land-and-groove recording method is a very important method used in the development of a high-density storage medium, since a recording density can be doubled with the same line storage density and the same track pitch.

It is reported that with the magneto-optical recording medium, the above-mentioned MSR method not only can improve the line recording density but also reduces an intertrack crosstalk. Therefore, various attempts have been made to apply the MSR method to the land-and-groove recording method. However, conditions for generating magnetic super resolution are extremely complicated. For example, such conditions may be that a reproduction laser power depends on a line density, a reproduction magnetic field is necessary and at least three magnetic layers are necessary. Therefore, the MSR method tends to be unstable and costly.

Also, Japanese Laid-Open Patent Application No. 8-7357 proposes an optical information storage unit which can reduce crosstalk originating from lands or grooves by appropriately choosing the depth of the grooves.

Further, Japanese Laid-Open Patent Application No. 9-128825 proposes an optical information storage unit which records and reproduces information in/from lands having substantially the same width as that of grooves having an optical depth of substantially 1/8 wavelength (57 nm).

However, in an actual optical system, absolute values of a phase difference necessary for land reproduction and a phase difference necessary for groove reproduction do not always coincide. This is because it is a component such as a right-angle mirror or a polarization beam splitter of an optical information storage unit that causes a phase difference.

Therefore, as described in Japanese Laid-Open Patent Application No. 9-272868, the present applicant proposes an optical information-storage unit provided with a wave plate and a diffraction grating so as to obtain a stable phase difference by appropriately adjusting an inclination of the wave plate.

In the optical information storage unit of the related art, if the track pitch is narrowed, crosstalk may occur during reproduction. The crosstalk is caused when data signals of neighboring regions are mixed into an output signal of the region to be reproduced. With a land recording or a groove recording of the related art, since each land is provided between grooves or each groove is provided between lands, there is a certain separation between regions in which information is written. Therefore, possible crosstalk is suppressed. However, with a land-and-groove recording, since information recording regions are adjacent to each other, a reproduction feature is likely to be influenced by the crosstalk.

Japanese Laid-Open Patent Application No. 8-7357 describes reducing the crosstalk from lands or grooves by appropriately choosing the depth of the grooves. However, since an ordinary medium will be free of crosstalk when the groove depth is approximately 1/6 wavelength, a carrier level of the signals will be reduced with the magneto-optical recording medium compared to an ordinary case where the groove depth is 1/8 wavelength. Also, push-pull signals, which serve as track error signals, are reduced. Further, it is reported that the abovedescribed crosstalk-free conditions are easily altered as a result of change in a Kerr-ellipticity ratio, focal error of an objective lens, and spherical aberration.

Japanese Laid-Open Patent Application No. 9-128825 discloses an optical information storage unit in which information is recorded and reproduced in/from lands having substantially the same width as grooves having an optical depth of substantially 1/8 wavelength (57 nm). However, since two read channels are required for land reproduction and groove reproduction, there is a problem that an optical system has a complicated structure and thus is expensive.

Further, Japanese Laid-Open Patent Application No. 9-272868 discloses a structure in which a stable phase difference is obtained by regulating merely a relationship between a diffraction grating and a wave plate, and thus an adjustment of the phase difference is not possible.

SUMMARY OF THE INVENTION

Accordingly, it is a general object of the present invention to provide an optical information storage unit which can satisfy the needs described above.

It is another and more specific object of the present invention to provide an optical information storage unit which can be adjusted to a stable phase difference.

In order to achieve the above objects according to the present invention, an optical information storage unit includes a first wave plate on which reflected light from a magneto-optical recording medium is incident; a diffraction grating on which the light having been transmitted through the first wave plate is incident; a second wave plate on which the light having been transmitted through the diffraction grating is incident; and a polarization detecting unit on which the light having been transmitted through the second wave plate is incident. Also, the optical information storage unit may further include a land-information-signal reproducing-unit for reproducing information formed on lands using signals output from said polarization detecting unit, and a groove-information-signal reproducing-unit for reproducing information formed on grooves using signals output from said polarization detecting unit.

With the optical information storage unit described above, optimum reproduction signals can be obtained by adjusting an inclination of the first wave plate and the diffraction grating.

Other objects and further features of the present invention will be apparent from the following detailed description when read in conjunction with the accompanying drawings.

DETAILED DESCRIPTION OF THE PREFERRED EMBODIMENTS

In the following, principles and embodiments of the present invention will be described with reference to the accompanying drawings.

Figure 1:
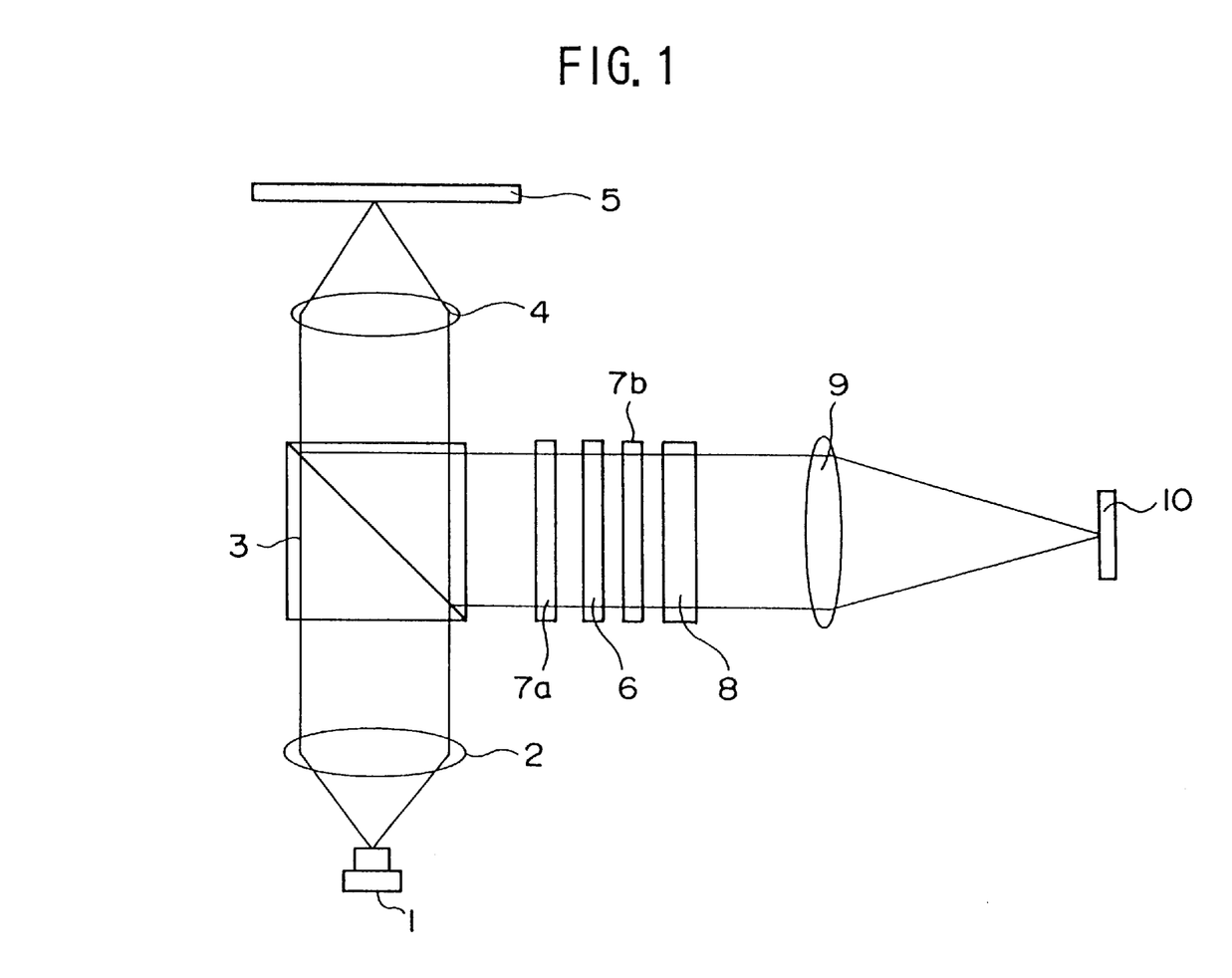
FIG. 1 is a schematic diagram of an optical information storage unit of a first embodiment of the present invention.

FIG. 1 is a schematic diagram of an optical information storage unit of a first embodiment of the present invention.

A luminous flux emitted from a semiconductor laser 1 passes through a collimator lens 2 which converts the luminous flux into a parallel light beam. The parallel light beam is incident on a polarization beam splitter 3. In FIG. 1, the light beam is parallel to the plane of paper.

The polarization beam splitter 3 has transmission and reflection characteristics of:

Tp:Rp=80:20 and
Ts:Rs=2:98, for P-polarized light and S-polarized light, respectively, where T is an intensity of transmission and R is an intensity of reflection. The luminous flux which has passed through the polarization beam splitter 3 is reduced to a diffraction limit by means of an objective lens 4, and is irradiated onto lands or grooves which serve as recording tracks of a magneto-optical recording medium 5.

The luminous flux reflected off the magneto-optical recording medium 5 again passes through the objective lens 4, then is incident on the polarization beam splitter 3 and is reflected according to the polarization characteristic so as to be guided into a magneto-optic detection optical system. The luminous flux guided into the magneto-optic detection optical system passes through a first wave plate 7a and then is separated into a plurality of luminous flux by means of a diffraction grating 6 made of a material such as glass or resin. Among the separated luminous flux, a 0th order light and +/−1st order lights are used for detecting magneto-optic signals.

Here, a diffraction efficiency of the diffraction grating 6 is determined such that a sum of intensities of the +/−1st order lights and an intensity of the 0th order light are substantially equal. Also, the diffraction efficiency is determined such that a sum of the intensities of the 0th order light and the +/−1st order lights is more than 80% of the total intensity.

Subsequently, each luminous flux is incident on a second wave plate 7b. The 0th order light is incident on the second wave plate 7b at a substantially perpendicular angle. The +/−1st order lights are incident on the second wave plate 7b at diffraction angles according to a grating pitch of the diffraction grating 6. Each of the luminous flux which have passed through the second wave plate 7b is incident on a Wollaston prism 8 so as to be polarized and detected and further separated into a P-component and an S-component. Each of the P- and S-components passes through a convergent lens 9 and then is collected and converted into an electric signal by a photodetector 10.

Figure 2A:
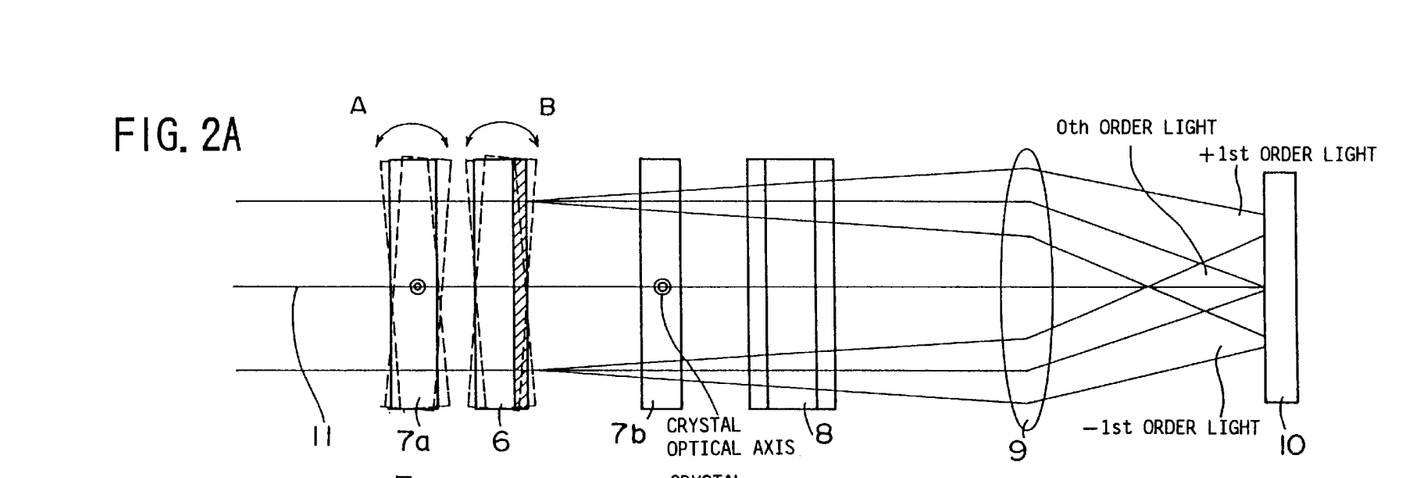
FIGS. 2A and 2B are detailed diagrams of the optical information storage unit of the first embodiment of the present invention.
Figure 2B:
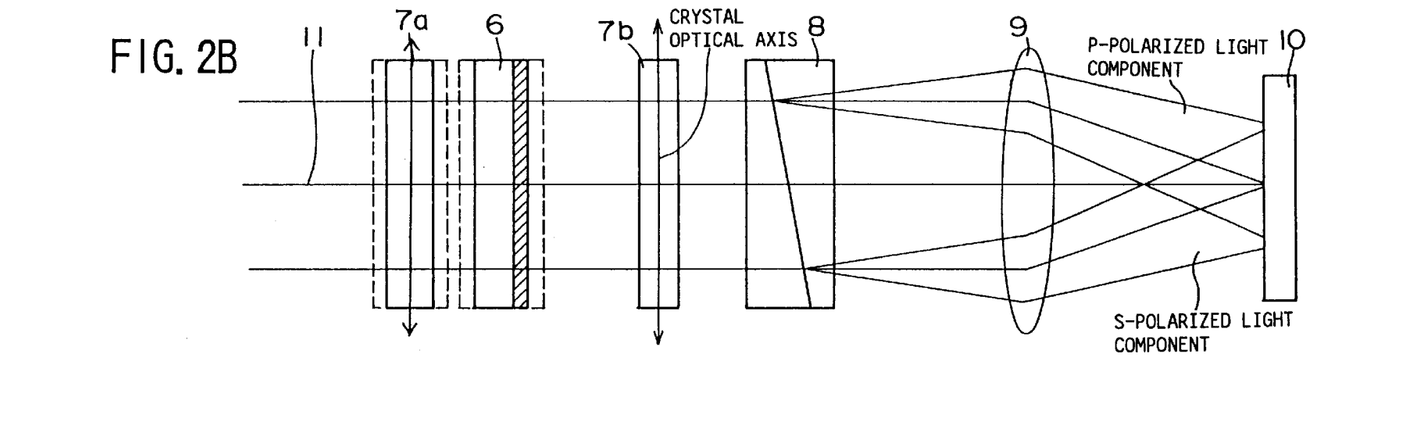

FIGS. 2A and 2B are detailed diagrams of the optical information storage unit of the first embodiment of the present invention. FIG. 2A is a diagram viewed in a direction parallel to a crystal optical axis of the first wave plate 7a and FIG. 2B is a diagram viewed in a direction perpendicular to a crystal optical axis of the first wave plate 7a.

Referring to FIG. 2A, the luminous flux which has passed through the first wave plate 7a is separated into the 0th order light and the +/−1st order lights by the diffraction grating 6. For instance, the 0th order light may be used for groove reproduction and the +/−1st order lights may be used for land reproduction. The 0th order light is incident on the second wave plate 7b at a substantially perpendicular angle and is provided with a phase difference required for groove reproduction which phase difference is determined by a thickness of the second wave plate 7b. Here, the second wave plate 7b gives the 0th order light a phase difference of N·λ/2−P, where N is a positive integer excluding zero and P is an amount of phase compensation required for groove reproduction.

On the other hand, the +/−1st order lights used for land reproduction are separated symmetrically about the 0th order light at an angle determined by the grating pitch of the diffraction grating 6. The +/−1st order lights are obliquely incident on the second wave plate 7b. In other words, the +/−1st order lights are incident on the second wave plate 7b as if the second wave plate 7b was rotated in a clockwise or counterclockwise direction about the crystal optical axis.

As a result, the +/−1st order lights will pass through the second wave plate 7b along a greater optical distance. Therefore, it is possible to obtain a greater phase difference without affecting the speeds of an ordinary ray and an extraordinary ray.

In the following, procedures for producing an optimal phase difference will be described for a case of reproducing lands and for a case of reproducing grooves.

In an actual optical system, absolute values of a phase difference necessary for land reproduction and a phase difference necessary for groove reproduction do not always coincide. This is because it is a component such as a right-angle mirror or a polarization beam splitter of an optical information storage unit that causes a phase difference.

Also, it is extremely difficult to control these phase differences. Thus, first, a method of providing an optimal phase difference will be described for a case where a 0th order light separated by the diffraction grating 6 is used for groove reproduction. In this case, since the 0th order light is arranged so as to be incident substantially at a perpendicular angle to the second wave plate 7b, the phase difference provided by the second wave plate 7b will be determined according to the specification of the second wave plate 7b.

However, in the present embodiment, the first wave plate 7a is arranged between the diffraction grating 6 and the polarization beam splitter 3. As shown in FIG. 2A, the first wave plate 7a is inclined in the direction of an arrow of A about the crystal optical axis. In other words, the first wave plate 7a is rotated in a clockwise or a counterclockwise direction about the crystal optical axis. Thus, an optimal phase difference can be provided for groove reproduction.

When reproducing the lands, the +/−1st order lights, which have been separated by the diffraction grating 6, are used. In the following, an adjustment method for achieving an optimal phase difference will be described.

After optimizing the phase difference of the 0th order light by means of the first wave plate 7a, as shown in FIG. 2A, the diffraction grating 6 is inclined in a direction of an arrow B about the optical axis. The direction of inclination of the diffraction grating 6, that is to say, the direction of the arrow B, corresponds to a direction in which an apparent grating pitch changes with respect to the luminous flux transmitted through the diffraction grating 6. In other words, the diffraction grating 6 may be rotated in a clockwise or counterclockwise direction about the crystal optical axis.

Thus, as a result of adjusting inclinations of the first wave plate 7a and the diffraction grating 6 by the first and second adjustment procedures, the grating pitch is altered with respect to the transmission beam. The change in the grating pitch causes a change in the separation angle of the +/−1st order lights separated by the diffraction grating 6. The change in the separation angle of the +/−1st order lights causes a change in an angle of incidence on the second wave plate 7b.

As a result of the change in the angle of incidence on the second wave plate 7b, a length of an optical path of the luminous flux transmitted through the second wave plate 7b is changed. Thus, an optimal phase difference is provided for land reproduction. Of course, such an adjustment does not affect the phase difference of the 0th order light required for groove reproduction.

Also, adjustments of inclinations of the diffraction grating 6 and the first wave plate 7a can be implemented in the following manner. First, the inclinations of the diffraction grating 6 and the first wave plate 7a are adjusted by means of an automatic adjustment device for adjusting the inclinations of the diffraction grating 6 and the first wave plate 7a according to output signals. Then, the diffraction grating 6 and the first wave plate 7a may be fixed by adhesives or screws at their rotated positions.

Now, a specification of the second wave plate 7b will be described.

For example, when a wavelength is 680 nm, a numerical aperture of the objective lens 4 is 0.55, a width of lands and grooves is 0.7 μm and an optical depth of the groove is approximately $\lambda/8$, a phase compensation of approximately +30 degrees is required for the $0^{th}$ order light for groove reproduction and a phase compensation of −30 degrees is required for the +/−1st order lights for land reproduction.

In this case, the second wave plate 7b provides the 0th order light the phase difference of $N\cdot\lambda/2-P$, where P is the amount of phase compensation (nm) required for groove reproduction. When N=2, the phase difference can be expressed as an angle of 330 degrees.

In the following, a detailed description will be made of the fact that the second wave plate 7b gives the 0th order light the phase difference of $N\cdot\lambda/2-P$.

For example, a half-wave plate causes a plane of polarization of luminous flux to rotate about the crystal optical axis which serves as an axis of symmetry. However, if the half-wave plate is provided instead of the second wave plate 7b, the reference phase difference is not a function of the amount of required phase compensation. That is to say, the reference phase difference is limited to zero or a multiple of $\lambda/2$. For a flux incident at a perpendicular angle, such as the 0th order light, it is sufficient to provide the second wave plate 7b having a thickness which can provide a phase difference that can be obtained by subtracting an amount of required phase compensation from a multiple of $\lambda/2$.

On the other hand, since an amount of phase compensation required for the +/−1st order lights is −30 degrees, a required phase difference upon leaving the second wave plate 7b at an oblique angle will be 390 degrees. In other words, a distance through which the luminous flux of the +/−1st order lights are transmitted in the second wave plate 7b is to be increased by a factor of approximately 1.182. When the second wave plate 7b is made of crystal, an average refractive index is approximately 1.55 and a refractive angle at which the length of the optical path will be increased by a factor of 1.182 is approximately 32.2 degrees.

Therefore, it is necessary to have an angle of incidence of 55.6 degrees. That is to say, the grating pitch of the diffraction grating 6 should be approximately 0.84 μm. However, this grating pitch may be increased by increasing the factor N. For example, the grating pitch of the diffraction grating 6 can be 1.12 μm when N=4. By further increasing N, the grating pitch will be greater, so that a sufficient phase difference can be obtained with a small separation angle.

Also, the same effect can be obtained when the 0th order light is used for land reproduction and the +/−1st order lights are used for groove reproduction. In this case, it is necessary to rotate the diffraction grating 6 and the wave plates 7a, 7b through 90 degrees about the optical axis 11 of the optical system.

In the following, the Wollaston prism 8 which polarizes, detects and separates each luminous flux will be described. It is to be noted that a direction in which the luminous flux is separated by a diffraction phenomenon caused by the diffraction grating 6 and a direction in which the luminous flux is separated by a polarization characteristic of the Wollaston prism 8 are perpendicular to each other.

When using a three-beam Wollaston prism in which crystal optical axis of the two optical crystals constructing the Wollaston prism 8 are mutually arranged at an angle smaller than 90 degrees, the zero beam and the +/−1st beams are each separated into three luminous flux. The three separated luminous flux are collected by the convergent lens 9. Each of the nine separated luminous flux are then collected and converted into an electric signal by a respective one of the photodiodes of the photodetector 10.

Figures 3A, 3B:
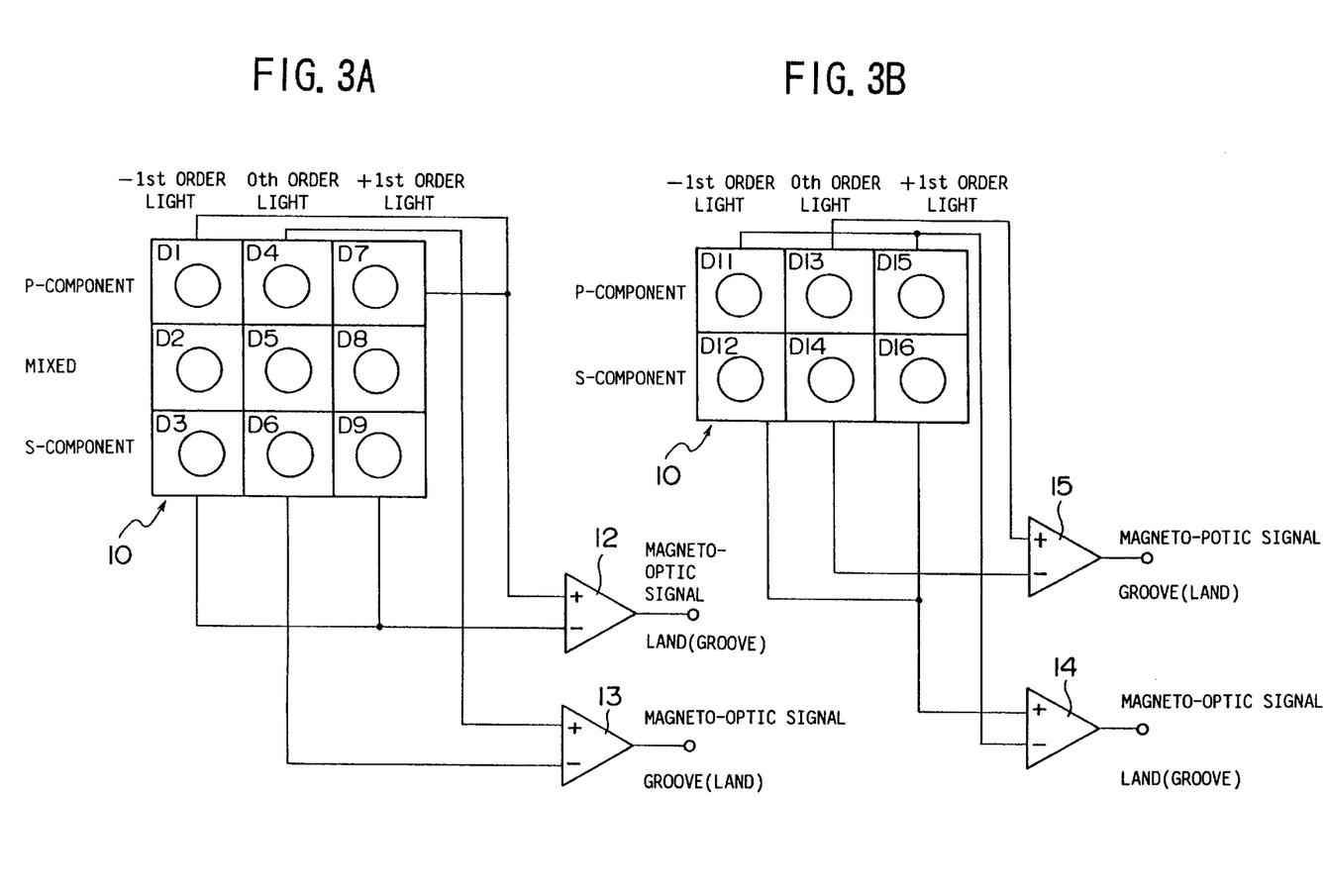
FIGS. 3A and 3B are diagrams showing a photodetector of the optical information storage unit of the first embodiment of the present invention.

FIGS. 3A and 3B are diagrams showing a photodetector of the optical information storage unit of the first embodiment of the present invention. In FIG. 3A, a three-beam Wollaston prism is used as the Wollaston prism 8 and in FIG. 3B, a two-beam Wollaston prism is used as the Wollaston prism 8.

When using a three-beam Wollaston prism as the Wollaston prism 8, P-polarized light components, S-polarized light components and mixed components of the P- and S-polarized light components are obtained. As shown in FIG. 3A, the photodetector 10 includes photodiodes D1 to D9 which detect the P-polarized light components, S-polarized light components and mixed components of the P- and S-polarized light components for each of the 0th order light and +/−1st order lights.

Among the three luminous flux separated from the −1st order light, the P-polarized light component is collected by the photodiode D1, the mixed component of the P- and S-polarized light components is collected by the photodiode D2, and the S-polarized light component is collected by the photodiode D3. Also, among the three luminous flux separated from the 0th order light, the P-polarized light component is collected by the photodiode D4, the mixed component of the P- and S-polarized light components is collected by the photodiode D5, and the S-polarized light component is collected by the photodiode D6. Further, among the three luminous flux separated from the +1st order lights, the P-polarized light component is collected by the photodiode D7, the mixed component of the P- and S-polarized light components is collected by the photodiode D8, and the S-polarized light component is collected by the photodiode D9.

A differential amplifier 12 outputs magneto-optic signals reproduced from lands (or grooves) by differentially amplifying a sum of P-polarized light components of the +/−1st order lights obtained from the photodiodes D1, D7 and a sum of S-polarized light components of the +/−1st order lights obtained from the photodiodes D3, D9. A differential amplifier 13 outputs magneto-optic signals reproduced from grooves (or lands) by differentially amplifying a P-polarized light component of the 0th order light obtained from the photodiode D4 and an S-polarized light component of the 0th order light obtained from the photodiode D6.

The mixed components of the P- and S-polarized light components of the 0th order light and the +/−1st order lights obtained from the photodiodes D2, D5, D8 are used for producing focus error signals and tracking error signals. For example, by introducing the convergent lens 9 and a cylindrical lens (not shown) into FIG. 3, the focus error signals may be produced by a known means using an astigmatism method.

When using a two-beam Wollaston prism as the Wollaston prism 8, only P-polarized light components and S-polarized light components are obtained and mixed components of the P- and S-polarized light components are not obtained. As shown in FIG. 3B, the photodetector 10 includes photodiodes D11 to D16 which detect the P-polarized light components and S-polarized light components for each of the 0th order light and +/−1st order lights.

Among two luminous flux separated from the −1st order light, the P-polarized light component is collected by the photodiode D11 and the S-polarized light component is collected by the photodiode D12. Also, among two luminous flux separated from the 0th order light, the P-polarized light component is collected by the photodiode D13 and the S-polarized light component is collected by the photodiode D14. Further, among two luminous flux separated from the +1st order light, the P-polarized light component is collected by the photodiode D15 and the S-polarized light component is collected by the photodiode D16.

A differential amplifier 14 outputs magneto-optic signals reproduced from lands (or grooves) by differentially amplifying a sum of P-polarized light components of the +/−1st order lights obtained from the photodiodes D11, D15 and a sum of S-polarized light components of the +/−1st order lights obtained from the photodiodes D12, D16. A differential amplifier 15 outputs magneto-optic signals reproduced from grooves (or lands) by differentially amplifying a P-polarized light component of the 0th order light obtained from the photodiode D13 and a S-polarized light component of the 0th order light obtained from the photodiode D14.

In the following, signal characteristics will be described which signal characteristics were obtained by recording and reproducing information by means of the optical information storage unit of the present invention.

Figure 4:
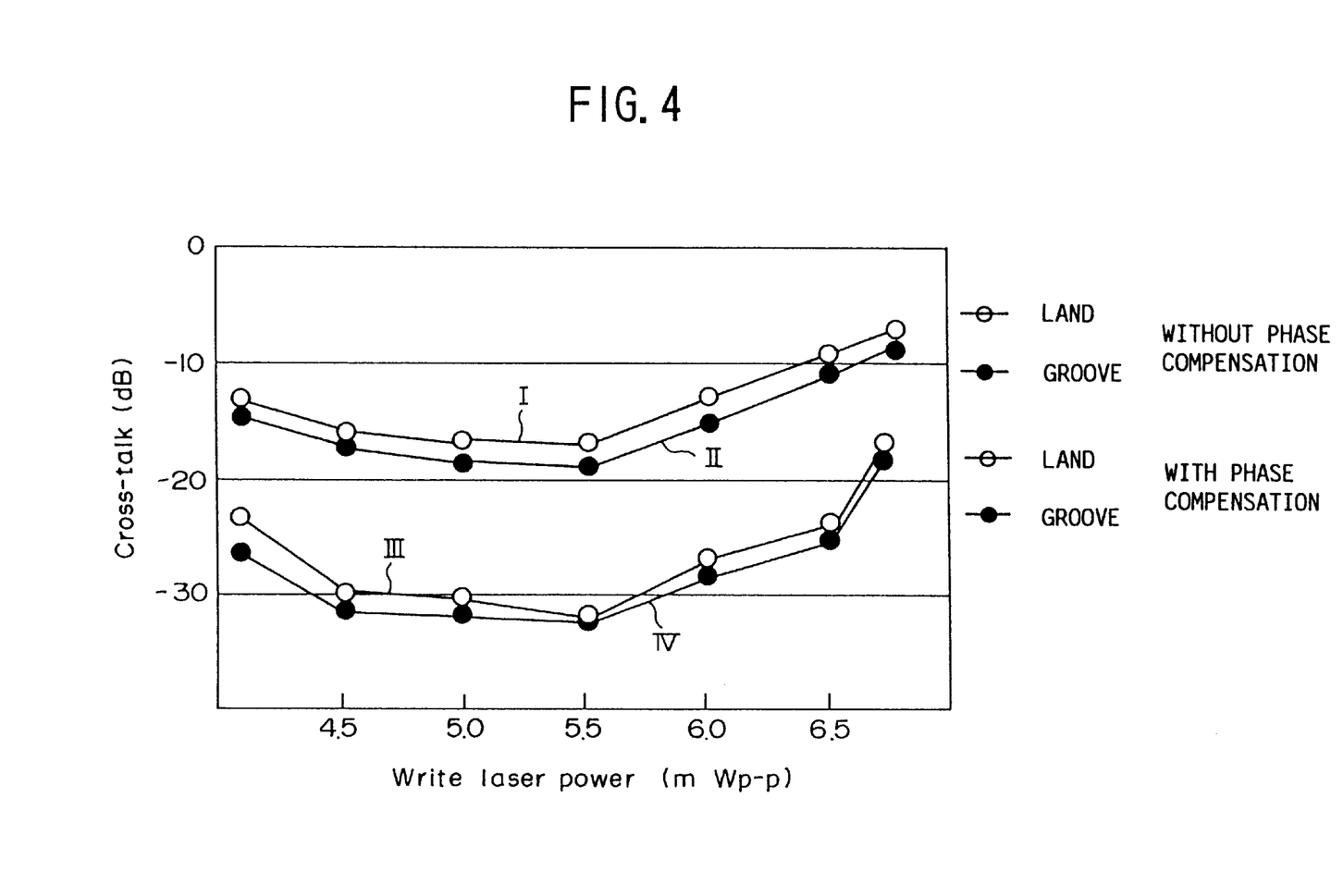
FIG. 4 is a diagram showing a graph of laser power versus crosstalk of the optical information storage unit of the first embodiment of the present invention.

FIG. 4 is a diagram showing a graph of laser power versus crosstalk of the optical information storage unit of the first embodiment of the present invention. In the figure, white circles "○" show crosstalk from the lands and black circles "●" show crosstalk from the grooves. Also, characteristics I, II correspond to a case without phase compensation and characteristics III, IV correspond to a case with phase compensation.

Here, the wavelength of the laser beam emitted from the semiconductor laser 1 was 680 nm and the numerical aperture of the objective lens 4 was 0.55. The magneto-optical recording medium 5 had lands and grooves of a width of 0.7 $\mu$m. The optical depth of the grooves was $\lambda/8$.

First, intertrack crosstalk will be described with respect to its dependency on recording laser power. A mark having a length of 2 $\mu$m was recorded on a land or a groove and a carrier level Cm, which corresponds to a reproduction signal level thereof, was measured. Further, neighboring grooves or lands on both sides of the relevant land or groove are reproduced. One of the neighboring grooves or lands having higher carrier level is referred to as Ca max. The crosstalk Ct of the relevant mark is derived by an expression:

$$Ct=(Ca\ max-Cm).$$

When phase compensation is not implemented, as shown in FIG. 4 with the characteristics I, II, the intertrack crosstalk will be extremely high, i.e., higher than −20 dB. Thus, during signal reproduction from the land and groove, it is not possible to achieve a jitter of less than 12% at any recording laser power.

In the present embodiment, a read channel for signal reproduction from the lands of the magneto-optical recording medium 5 and a read channel for signal reproduction from the grooves of the magneto-optical recording medium 5 are provided. However, since phase compensation is implemented, there are no inconveniences such as the signal level being reduced and sufficient CNR not being obtained. Thus, a signal quality is significantly improved.

The crosstalk for both lands and grooves was below −30 dB for a wide range of recording laser power. Here, the magneto-optical recording medium 5 had grooves of an optical depth of substantially λ/8. Therefore, when recording and reproducing in/from the lands and grooves, an amount of phase compensation with minimum crosstalk and an amount of phase compensation with maximum narrow-band signal-to-noise ratio (hereinafter referred to as CNR) are equal. That is to say, amounts of phase compensation giving a maximum CNR and minimum crosstalk will be equal in the land reproduction and the groove reproduction.

In the following, a 2T jitter will be described with respect to its dependency on recording laser power. Here, the optical information storage unit of the present embodiment was used. Random signals were recorded at a linear speed of 4.5 m/s, with RLL1-7 code, with the length 2T of the shortest mark being 0.48 μm. Such random signals were reproduced with a reproduction laser power of 1.3 mW. Here, the reproduction laser power is a power during objective lens emission.

Figure 5:
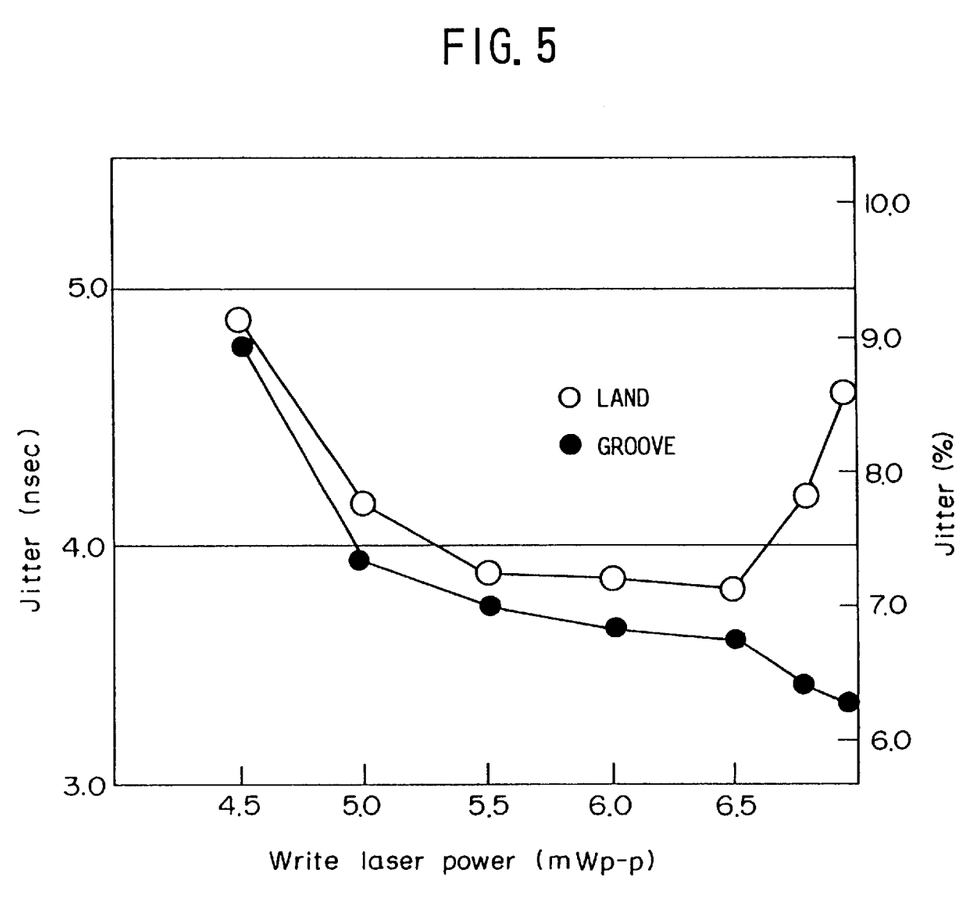
FIG. 5 is a diagram showing a graph of laser power versus jitter of the optical information storage unit of the first embodiment of the present invention.

FIG. 5 is a diagram showing a graph of laser power versus jitter of the optical information storage unit of the first embodiment of the present invention. FIG. 5 shows measurements of the dependency of the 2T jitter on recording laser power. In the figure, white circles "○" show temporal fluctuation, i.e., jitter, from the lands, and black circles "●" show jitters from the grooves. In this context, jitter means a value obtained by a ratio of a predetermined window width (time) against a standard deviation σ2T of the 2T signal multiplied by 100 (%). Also, the reproduction laser power is a power during emission from the objective lens 4. Therefore, reproduction outputs corresponding to 0.65 mW were obtained from each one of the lands and grooves.

FIG. 5 shows a case where the signals were recorded on both the lands and grooves of the magneto-optical recording medium 5. As shown in the figure, the jitter was shown to retain a large margin of less than 9% for a wide range of the recording laser power. In general, if an average jitter, i.e., the jitter between clocks and data, is less than 12%, it is considered to be within a sufficient range for use in recording and reproducing the data. In the present embodiment, even though a jitter of 2T, which is the length of the shortest mark, was used for evaluation, a sufficient result of less than 9% was-obtained. Therefore, it is understood that the present embodiment is sufficient for recording and reproducing the data.

Thus, reproduction outputs corresponding to 0.65 mW appeared in read channels of the lands and grooves. When information was recorded on both the lands and grooves (first, information was recording on the lands), and then the information was reproduced from the lands and grooves, respectively, the jitter was shown to retain a large margin of less than 9% for a wide range of the recording laser power. Here, jitter is defined by a value obtained by a ratio of a predetermined window width (time) against a standard deviation σ2T of the 2T signal multiplied by 100 (%).

In general, if an average jitter, i.e., the jitter between clocks and data, is less than 12%, it is considered to be within a sufficient range for use in recording and reproducing the data.

In the present embodiment, since a jitter of 2T, which is the length of the shortest mark, was used for evaluation, the result should be worse compared to the result obtained when an average jitter (i.e., jitter between a clock and a data) is used. However, a sufficient result was obtained. It might seem that a sufficient CNR could not be obtained since dedicated read channels are provided for lands and grooves and thus the signal level is halved. However, quality of signals is theoretically significantly improved since the signals are phase compensated during each reproduction.

When using an optical information storage unit of the related art which is not provided with a phase compensation function, the intertrack crosstalk was extremely large, i.e., above −20 dB. Thus, it was impossible to achieve a jitter of less than 12% in either of the laser powers during signal reproduction of the lands and grooves.

As has been described, according to the present embodiment, an optimal phase difference for land reproduction can be adjusted by adjusting the inclination of the first wave plate 7a, and an optimal phase difference for groove reproduction can be adjusted by adjusting the inclination of the diffraction grating 6. Therefore, the optimal phase difference for land reproduction and the optimal phase difference for groove reproduction can be adjusted independently. Thus, a high-quality reproduction is facilitated even when reproducing a magneto-optical recording medium of a narrow track-pitch.

It is to be noted that in the present embodiment, a normal diffraction grating 6 is used, but a blaze-type diffraction grating can be used instead of the normal diffraction grating 6.

Figure 6:
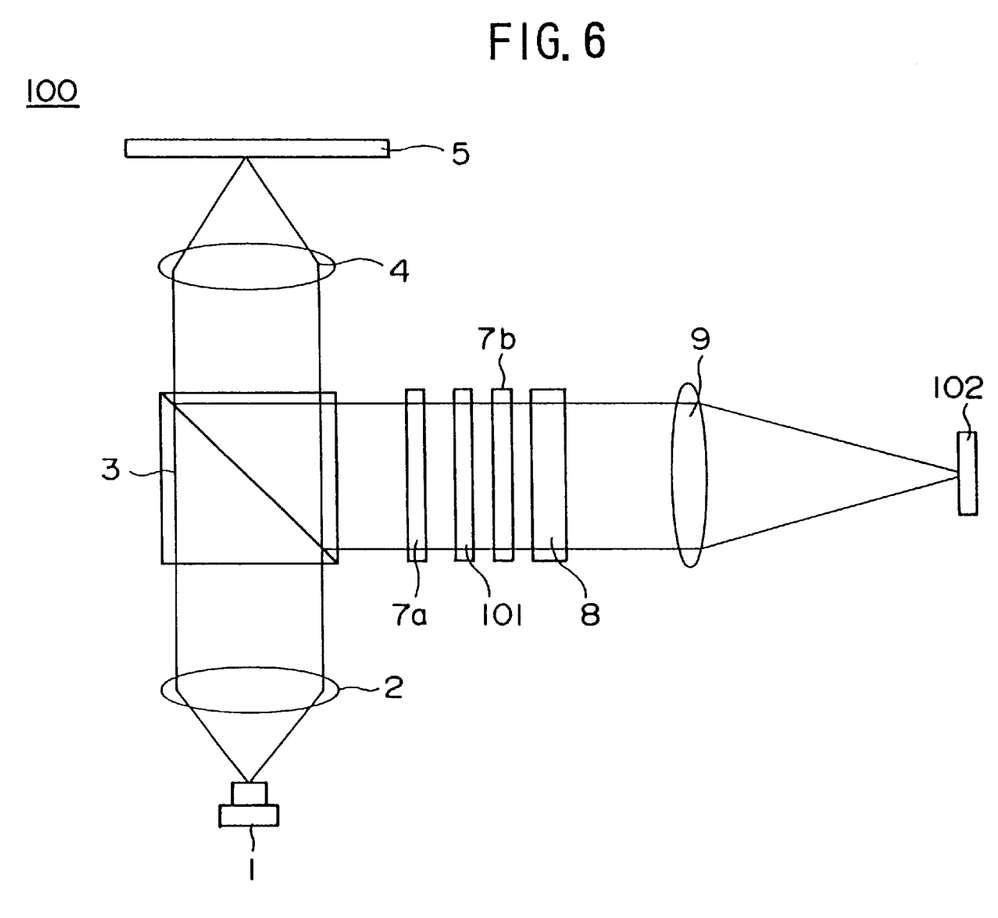
FIG. 6 is a schematic diagram of an optical information storage unit of a second embodiment of the present invention.
Figure 7A:
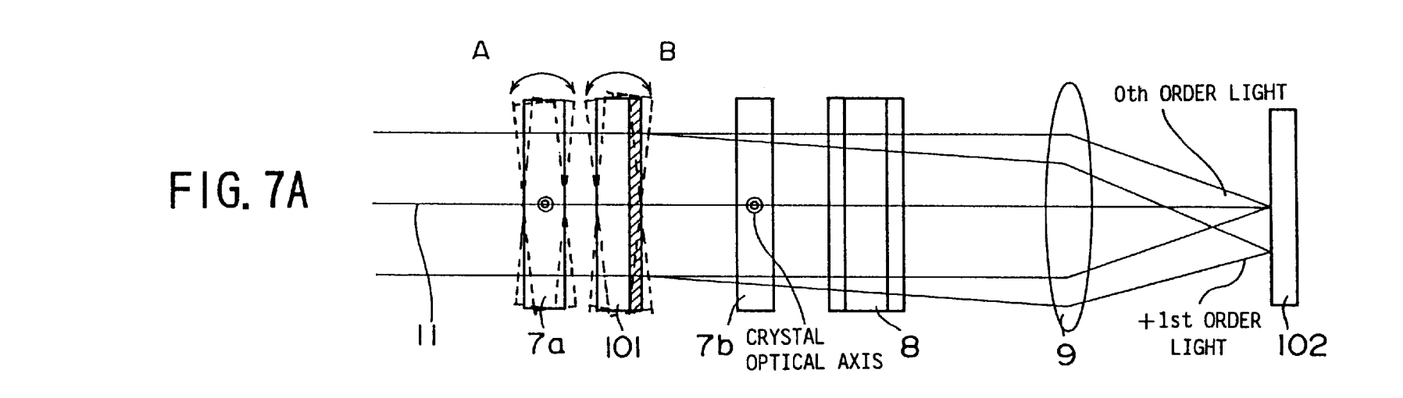
FIGS. 7A, 7B and 7C are detailed diagrams of the optical information storage unit of the second embodiment of the present invention.
Figures 7B, 7C:
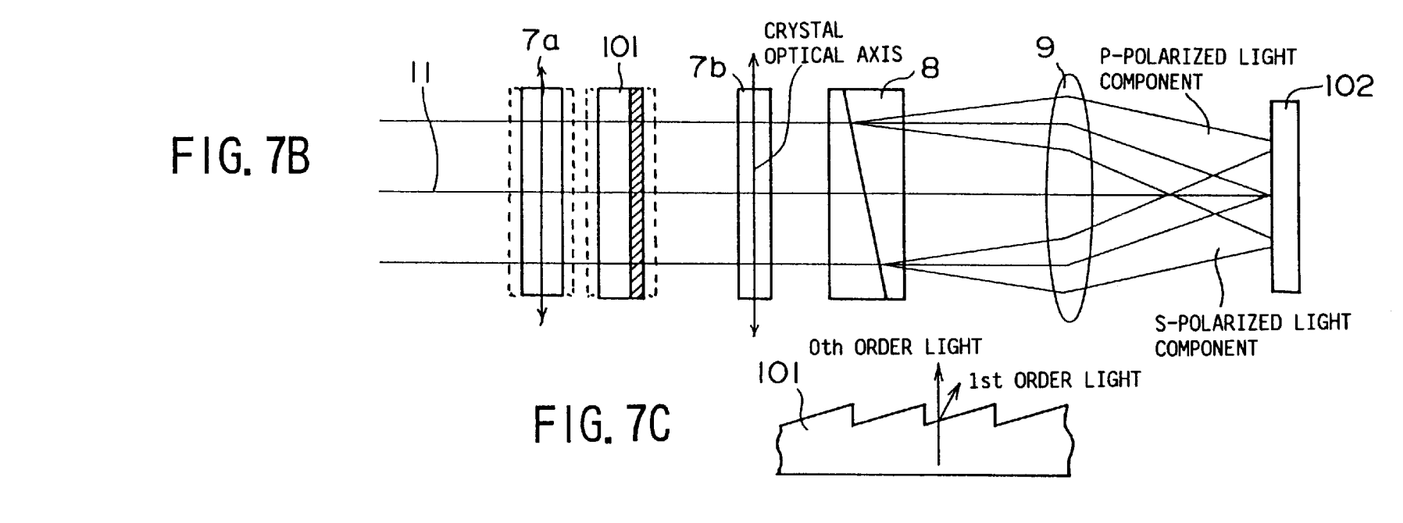

FIG. 6 is a schematic diagram of an optical information storage unit of a second embodiment of the present invention. FIGS. 7A, 7B and 7C are detailed diagrams of the optical information storage unit of the second embodiment of the present invention. FIG. 7A is a diagram viewed in a direction parallel to a crystal optical axis of the first wave plate 7a, FIG. 7B is a diagram viewed in a direction perpendicular the crystal optical axis of the first wave plate 7a and FIG. 7C is a diagram showing an output beam of a blaze-type diffraction grating 101.

The normal diffraction grating 6 has a cross section of a simple wave shape or a rectangular shape. As shown in FIG. 7C, the blaze-type diffraction grating 101 has a cross section of an asymmetrical saw-toothed shape. Due to the surface structure, the blaze-type diffraction grating 101 only generates the 0th order light and the +1st order lights, while −1st order light is hardly generated.

The use of the blaze-type diffraction grating 101 simplifies the structure of a photodetector 102 used for detecting the recording signals.

Figures 8A, 8B:
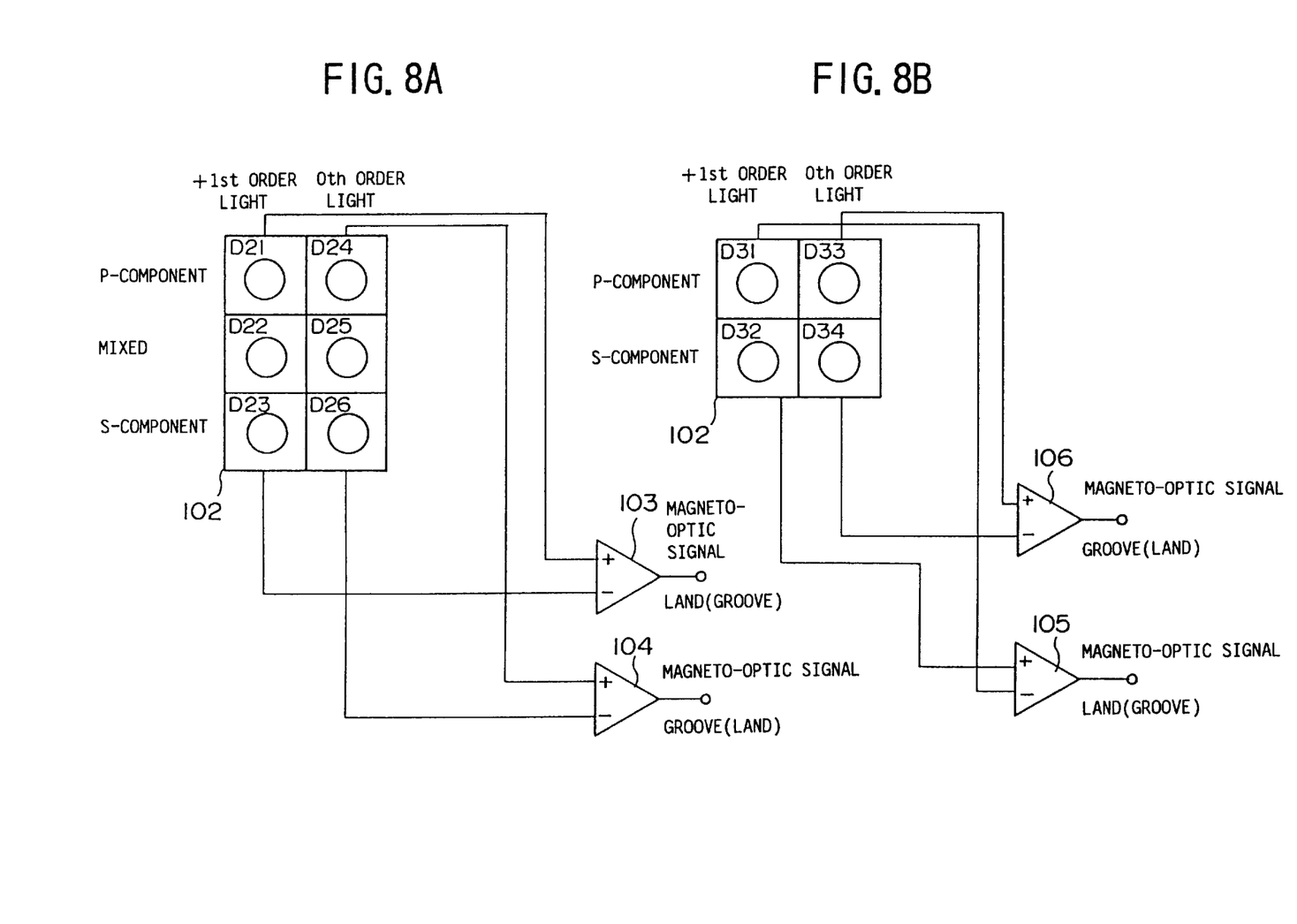
FIGS. 8A and 8B are diagrams showing a photodetector of the optical information-storage unit of the second embodiment of the present invention.

FIGS. 8A and 8B are diagrams showing a photodetector of the optical information storage unit of the second embodiment of the present invention. In FIG. 8A, a three-beam Wollaston prism is used as the Wollaston prism 8 and in FIG. 8B, a two-beam Wollaston prism is used as the Wollaston prism 8.

When using a three-beam Wollaston prism as the Wollaston prism 8, P-polarized light components, S-polarized light components and mixed components of the P- and S-polarized light components are obtained. As shown in FIG. 3A, the photodetector 102 includes photodiodes D21 to D26 which detect the P-polarized light components, the S-polarized light components and mixed components of the P- and S-polarized light components for each of the 0th order light and +1st order lights.

Among three luminous flux separated from the +1st order light, the P-polarized light component is collected by the photodiode D21, the mixed component of the P- and S-polarized light components is collected by the photodiode D22, and the S-polarized light component is collected by the photodiode D23. Also, among three luminous flux separated from the 0th order light, the P-polarized light component is collected by the photodiode D24, the mixed component of the P- and S-polarized light components is collected by the photodiode D25, and the S-polarized light component is collected by the photodiode D26.

A differential amplifier 103 outputs magneto-optic signals reproduced from lands (or grooves) by differentially amplifying a P-polarized light component of the +1st order light obtained from the photodiode D21 and an S-polarized light component of the +1st order light obtained from the photodiode D23. A differential amplifier 104 outputs magneto-optic signals reproduced from grooves (or lands) by differentially amplifying a P-polarized light component of the 0th order light obtained from the photodiode D24 and a S-polarized light component of the 0th order light obtained from the photodiode D26.

The mixed components of the P- and S-polarized light components of the 0th order light and the +st order light obtained from the photodiodes D22, D25 are used for producing focus error signals and tracking error signals. For example, by introducing the convergent lens 9 and a cylindrical lens (not shown) into FIG. 7, the focus error signals may be produced by a known means using an astigmatism method.

When using a two-beam Wollaston prism as the Wollaston prism 8, only P-polarized light components and S-polarized light components are obtained and mixed components of the P- and S-polarized light components are not obtained. As shown in FIG. 8B, the photodetector 102 includes photodiodes D31 to D34 which detect the P-polarized light components and S-polarized light components for each of the 0th order light and +1st order light.

Among two luminous flux separated from the +1st order light, the P-polarized light component is collected by the photodiode D31 and the S-polarized light component is collected by the photodiode D32. Also, among two luminous flux separated from the 0th order light, the P-polarized light component is collected by the photodiode D33 and the S-polarized light component is collected by the photodiode D34.

A differential amplifier 105 outputs magneto-optic signals reproduced from lands (or grooves) by differentially amplifying a P-polarized light components of the +1st order light obtained from the photodiode D31 and an S-polarized light component of the +1st order light obtained from the photodiode D32.

A differential amplifier 106 outputs magneto-optic signals reproduced from grooves (or lands) by differentially amplifying a P-polarized light component of the 0th order light obtained from the photodiode D33 and a S-polarized light component of the 0th order light obtained from the photodiode D34.

In the present embodiment, only the 0th order light and the +1st order light are extracted. Thus, the 0th order light is used for reproducing the grooves, or lands, and the +1st order light is used for reproducing the lands, or the grooves. The intensity of the 0th order light and the intensity of the +1st order light are determined so as to be substantially equal. Also, the sum of the intensity of the 0th order light and the intensity of the +1st (alternatively −1st) order light is determined so as to be more than 80% of the total intensity. This ensures the detection of the information recorded on the lands and grooves.

Since the concepts and procedures for adjusting the first wave plate 7a and the diffraction grating 6 are similar to those of the first embodiment, further description is omitted.

In the present embodiment, the blaze-type diffraction grating 101 is arranged in such a manner that the +1st order light is reflected by a saw-toothed surface. However, the blaze-type diffraction grating 101 may be rotated through 180 degrees so that the −1st order light is reflected symmetrically opposite about the 0th order light. Therefore, by detecting the 0th order light and the −1st order light, the information recorded on the lands and grooves can be detected in a similar manner to the case where the +1st order light is used.

Also, similar effects can be obtained if the optical depth of the grooves of the magneto-optical recording medium takes a value such as $\lambda/8$, $3\lambda/8$, or $5\lambda/8$. Also, the present embodiment can be applied to a magneto-optical recording medium using magnetic super resolution (MSR), so as to achieve a further high-density recording and reproducing.

By using such an optical information storage unit, a high-quality magneto-optic detection without intertrack crosstalk is possible when information is recorded on the lands and grooves and then reproduced in a similar manner to the first embodiment. Further, it is possible to achieve a simple optical system and thus achieve a compact and inexpensive optical information storage unit.

Further, the present invention is not limited to these embodiments, but variations and modifications may be made without departing from the scope of the present invention.

The present application is based on Japanese priority application No. 10-168569 filed on Jun. 16, 1998, the entire contents of which are hereby incorporated by reference.

What is claimed is:

1. An optical information storage unit for reproducing information formed on lands and grooves of a magneto-optical recording medium by detecting reflected light from said recording medium, the unit has an optical system comprising:

a first wave plate on which said reflected light is incident, said first wave plate being rotatable about a crystal optical axis so as to provide a first optical phase difference of said reflected light;

a diffraction grating on which said light having been transmitted through said first wave plate is incident, said diffraction grating separating said light into at least three luminous flux;

a second wave plate on which said at least three luminous flux are incident, said second wave plate providing a second optical phase difference in a direction perpendicular to said reflected light; and a polarization detecting unit on which said light having transmitted through said second wave plate is incident.

2. The optical information storage unit as claimed in claim 1, wherein said diffraction grating is inclined with respect to an optical axis of an optical system so as to obtain a substantially maximum signal-to-noise ratio.

3. The optical information storage unit as claimed in claim 1, wherein said diffraction grating is inclined with respect to an optical axis of the optical system so as to obtain substantially minimum intertrack crosstalk.

4. The optical information storage unit as claimed in claim 1, wherein said first wave plate is inclined with respect to an optical axis of the optical system so as to increase a signal-to-noise ratio of reproduction signals of one of said lands and grooves.

5. The optical information storage unit as claimed in claim 1, wherein said first wave plate is inclined with respect to an optical axis of the optical system so as to reduce crosstalk of reproduction signals of one of said lands and grooves.

6. The optical information storage unit as claimed in claim 1, further comprising a first detecting part for detecting a 0th order light in said reflected light as reproduction signals of one of said lands and grooves.

7. The optical information storage unit as claimed in claim 1, further comprising a second detecting part for detecting at least one of +/−1st order lights in said reflected light as reproduction signals of one of said lands and grooves.

8. The optical information storage unit as claimed in claim 1, wherein said diffraction grating is inclined in a direction apparently changing a grating pitch of said diffraction grating with respect to said luminous flux transmitted through said diffraction grating.

9. The optical information storage unit as claimed in claim 1, wherein said first and second wave plates are made of uniaxial birefringence crystals.

10. The optical information storage unit as claimed in claim 1, wherein said diffraction grating is made of glass.

11. The optical information storage unit as claimed in claim 1, wherein said diffraction grating is made of resin.

12. The optical information storage unit as claimed in claim 1, wherein said diffraction grating is a blaze-type diffraction grating.

13. The optical information storage unit as claimed in claim 12, wherein intensities of a 0th order light and a +1st or a −1st order light diffracted by said blaze-type diffraction grating are substantially equal and wherein a sum of the intensities of the 0th order light and the +1st or −1st order light is more than 80% of the total light intensity.

14. An optical information storage unit for reproducing information formed on lands and grooves of a magneto-optical recording medium by detecting reflected light from said recording medium, the unit has an optical system comprising:

a first wave plate on which said reflected light is incident, said first wave plate being rotatable about a crystal optical axis so as to provide a first optical phase difference of said reflected light;

a diffraction grating on which said light having been transmitted through said first wave plate is incident, said diffraction grating separating said light into at least three luminous flux;

a second wave plate on which said at least three luminous flux are incident, said second wave plate providing a second optical phase difference in a direction perpendicular to said reflected light;

a polarization detecting unit on which said light having transmitted through said second wave plate is incident;

a land-information-signal reproducing-unit for reproducing information formed on lands using signals output from said polarization detecting unit, and a groove-information-signal reproducing-unit for reproducing information formed on grooves using signals output from said polarization detecting unit.

15. The optical information storage unit as claimed in claim 14, wherein said diffraction grating is inclined with respect to an optical axis of an optical system so as to obtain a substantially maximum signal-to-noise ratio.

16. The optical information storage unit as claimed in claim 14, wherein said diffraction grating is inclined with respect to an optical axis of the optical system so as to obtain substantially minimum intertrack crosstalk.

17. The optical information storage unit as claimed in claim 14, wherein said first wave plate is inclined with respect to an optical axis of the optical system so as to increase a signal-to-noise ratio of reproduction signals of one of said lands and grooves.

18. The optical information storage unit as claimed in claim 14, wherein said first wave plate is inclined with respect to an optical axis of the optical system so as to reduce crosstalk of reproduction signals of one of said lands and grooves.

19. The optical information storage unit as claimed in claim 14, further comprising a first detecting part for detecting a 0th order light in said reflected light as reproduction signals of one of said lands and grooves.

20. The optical information storage unit as claimed in claim 14, further comprising a second detecting part for detecting at least one of +/−1st order lights in said reflected light as reproduction signals of one of said lands and grooves.

* * * * *